The Speed Bookkeeping Pen Company
8447X
H. Blair.
Seed Planter.
Patented Oct. 14, 1834.
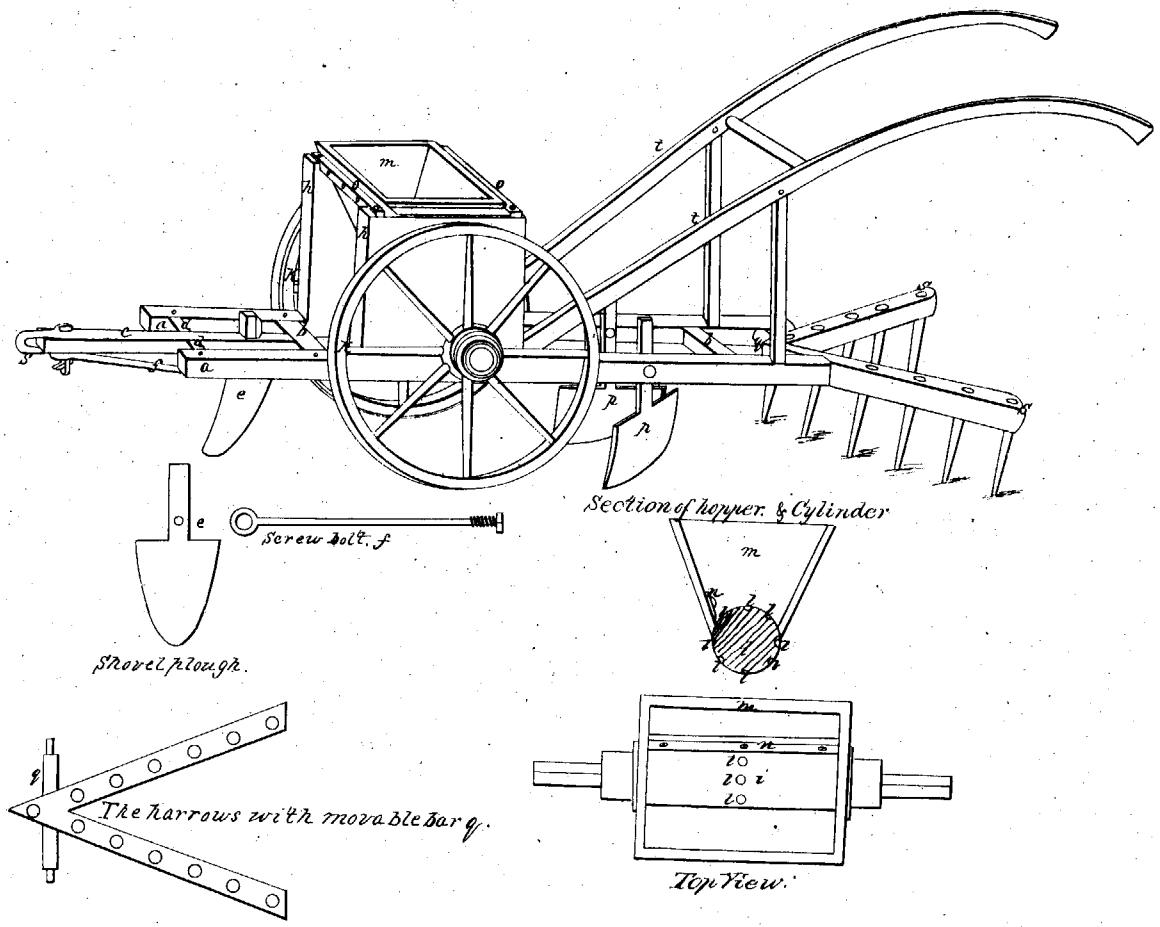
THE NORRIS PETERS CO., WASHINGTON, D. C.

The Schedule referred to in these Letters Patent, and making part of the same, containing a description in the words of the said Henry Blair himself, of his improvement, being a new and useful machine for planting Corn, called the corn Planter.

---

To all to whom these Presents shall come.

Be it known, that I, Henry Blair of Glenrop in the county of Montgomery, and State of Maryland, have invented a new and useful improvement in the machine for planting corn called the corn planter, and that the following is a full and exact description of the construction and operation of the same, as invented or improved by me. –

The frame of the machine is made as follows (viz) Two side pieces four feet six inches long are fa[illegible] [illegible]th. [illegible] by two cross pieces, being tenoned into them, one at ten inches from the end that will make the front of the machine, and the other at fourteen inches from the other end or back: the timber of which this frame is made, is three by four inches. The beam to which the horse is to be attached, is twenty inches in length, tenoned into the front cross piece in the middle between the two side pieces, and there is a brace piece of timber, one by two inches, which passes through a mortice cut into the beam. The ends of this piece are tenoned into the side pieces within six inches of their ends. To this beam is affixed a shovel plough, to make the furrow, the plough bar passes through the beam midway between the front cross piece, and the brace above mentioned, and is fastened on the top with a key. A screw bolt passes thro' the plough bar, made fast on the back with a nut and screw: and the other end has a hole through which passes the clevis bolt: the end of the beam is provided with a clevis to which is geared a horse.

On the top of the two side pieces are screwed two [illegible] heads fourteen inches long, five and a half high and three thick. They are tenoned into the side pieces within sixteen inches of the front, and a hole is cut through each, to receive a cylinder hereafter to be mentioned. The dropping cylinder is six inches in diameter, between the head blocks, and at each end, there is a space of three inches in length that is reduced to four inches diameter, which forms the bearings of the cylinder and work in the head blocks above mentioned; it then extends six inches (on each side) out side of the head blocks, and is there permanently attached to wheels of two feet six inches diameter; There are holes cut in the cylinder on its periphery sufficiently large to hold two, three or four grains of corn; these holes may be of any number; as the number of the holes, and the diameter of the wheels will regulate the distance at which the corn will be dropped. A box or hopper is constructed immediately above the cylinder, which covers about one third of its diameter, and extends the whole length of the cylinder between the head blocks. This box or hopper can be made to hold two or three gallons. The front part of this hopper, that is, the side towards which the cylinder revolves, is provided with a bar of iron, extending the whole length of the hopper, one inch wide, and a quarter of an inch thick, bevelled to an edge from the top; the lower surface of this iron bar rubs on the cylinder, to prevent the grains of corn from crowding in between the cylinder and the edge of the box or hopper. –

There are two wooden braces which are made fast to the front and back of the hopper, by means of screw bolts that extend from one head block to the other and are provided with a screw at each end, so arranged as that when either the surface of the cylinder, or the edge of the hopper wears out, by turning the screws the edge of the hopper can be made to rub on the surface of the cylinder. Between the cylinder and the back cross piece is to be attached by means of screw bolts, to the inside of the two side pieces two coulters, made right and left [illegible] to turn, the earth [illegible] [illegible] edge. Eight inches behind the back cross piece is a wooden bar having its ends working loose in the two side pieces. To this wooden bar is attached a harrow made of two pieces of wood put together in a triangle,
having its base open and its apex attached to the bar just men-
tioned. The teeth which are inserted into this harrow are
nine inches long at the apex of the triangle and increase
in length until they reach eleven inches at the base of the
triangle. The back part of this harrow will be at liberty to
play up and down, having its front part attached to the revolving
bar. The handles are four feet long, having their lower ends
set into the lower part of the head blocks and their upper ends
elevated to two feet seven inches above the frame; they are braced
in the usual manner.

Operation. When the horse draws the machine the
shovel plough makes a furrow to receive the grain; the cylinder in
revolving with the wheels, to which it is permanently attached, catches
the grains in the holes (which are made on its periphery) as they pass
through the hopper, and lets them drop into the furrow; the
covers then throw the earth into a ridge over the grain &
the harrow passing over it, levels the earth and carries the large
clods and stones away: The proportions herein stated, may be
varied at pleasure.

What I claim as new and as my invention and
for which I ask Letters Patent, is, the general arrangement and
combination of the several parts. For a further illustration of
my invention, I refer to the model and drawing which accom-
pany this.

In testimony that the above is a full and exact descrip-
tion of the construction and operation of my machine as invented
or improved by me, I have hereunto subscribed my hand this
first day of September in the year of our Lord one thousand eight
hundred & thirty four.

Witnesses
Henry Kertz
Jeb. Barber his
Henry X [illegible]
mark

[1196 words]

(Granted Octo. 14. 1834)